US012078963B2

(12) United States Patent
Brooker et al.

(10) Patent No.: US 12,078,963 B2
(45) Date of Patent: Sep. 3, 2024

(54) SYSTEM AND METHOD FOR HOLOGRAPHIC IMAGING OF A SINGLE PLANE OF AN OBJECT

(71) Applicant: CELLOPTIC, INC., Rockville, MD (US)

(72) Inventors: Gary Brooker, Rockville, MD (US); Nisan Siegel, Silver Spring, MD (US)

(73) Assignee: CELLOPTIC, INC., Rockville, MD (US)

( * ) Notice: Subject to any disclaimer, the term of this patent is extended or adjusted under 35 U.S.C. 154(b) by 194 days.

(21) Appl. No.: 17/322,326

(22) Filed: May 17, 2021

(65) Prior Publication Data
US 2021/0271204 A1 Sep. 2, 2021

Related U.S. Application Data

(63) Continuation of application No. 15/326,336, filed as application No. PCT/US2015/040024 on Jul. 10, 2015, now Pat. No. 11,029,646.
(Continued)

(51) Int. Cl.
*G02B 21/36* (2006.01)
*G02B 27/58* (2006.01)
(Continued)

(52) U.S. Cl.
CPC ......... *G03H 1/0005* (2013.01); *G02B 21/361* (2013.01); *G02B 21/367* (2013.01); *G02B 27/58* (2013.01); *G03H 1/041* (2013.01); *G03H 1/0443* (2013.01); *G03H 1/0486* (2013.01); *G03H 1/06* (2013.01); *G03H 1/28* (2013.01); *G03H 2001/005* (2013.01); *G03H 2001/0447* (2013.01); *G03H 2001/0452* (2013.01);
(Continued)

(58) Field of Classification Search
CPC .............................................. G02B 21/00–368
USPC ....................................... 359/1–35, 368–398
See application file for complete search history.

(56) References Cited

U.S. PATENT DOCUMENTS 6,147,798 A 11/2000 Brooker et al.
6,674,572 B1 * 1/2004 Scheruebl .......... G02B 21/0024
356/392
(Continued)

FOREIGN PATENT DOCUMENTS

WO WO 2015/145428 10/2005

OTHER PUBLICATIONS

Katz et al., "Enhanced resolution and throughput of Fresnel incoherent correlation holography (FINCH) using dual diffractive lenses on a spatial light modulator (SLM)", Optics Express vol. 20, No. 8, pp. 9109-9121, published Apr. 4, 2012 (Year: 2012).*
(Continued)

*Primary Examiner* — Ryan S Dunning
(74) *Attorney, Agent, or Firm* — Nixon & Vanderhye, PC

(57) ABSTRACT

A system and method to produce a hologram of a single plane of a three dimensional object includes an electromagnetic radiation assembly to elicit electromagnetic radiation from a single plane of said object, and an assembly to direct the elicited electromagnetic radiation toward a hologram-forming assembly. The hologram-forming assembly creates a hologram that is recorded by an image capture assembly and then further processed to create maximum resolution images free of an inherent holographic artifact.

25 Claims, 3 Drawing Sheets

Related U.S. Application Data

(60) Provisional application No. 62/023,958, filed on Jul. 14, 2014.

(51) Int. Cl.
*G03H 1/00* (2006.01)
*G03H 1/04* (2006.01)
*G03H 1/06* (2006.01)
*G03H 1/28* (2006.01)

(52) U.S. Cl.
CPC ... *G03H 2001/0458* (2013.01); *G03H 1/0493* (2013.01); *G03H 2210/33* (2013.01); *G03H 2222/31* (2013.01); *G03H 2222/34* (2013.01); *G03H 2222/36* (2013.01); *G03H 2223/12* (2013.01); *G03H 2223/17* (2013.01); *G03H 2223/52* (2013.01); *G03H 2240/56* (2013.01)

(56) References Cited

U.S. PATENT DOCUMENTS

| | | |
|---|---|---|
| 7,616,320 B2 | 11/2009 | Javidi et al. |
| 2002/0109872 A1 | 8/2002 | Hart |
| 2003/0151742 A1 | 8/2003 | Vermintz et al. |
| 2012/0182591 A1 | 7/2012 | Masmura |
| 2015/0268628 A1* | 9/2015 | Sato .................. G01B 9/02091 356/457 |

OTHER PUBLICATIONS

International Search Report for PCT/US2015/040024, mailed Sep. 24, 2015, 2 pages.
Written Opinion of the ISA for PCT/US2015/040024, mailed Sep. 24, 2015, 5 pages.
Siegel et al, "Reconstruction of objects above and below the objective focal plane with dimensional fidelity by FINCH fluorescence microscopy", Optics Express, Aug. 2012.
Siegel et al., "Improved axial resolution of FINCH fluorescence microscopy when combined with spinning disk confocal microscopy", Optics Express, Sep. 2014.
Jost et al., "Superresolution Multidimensional Imaging with Structured Illumination Microscopy", Annual Review of Materials Research, 2013, 43; pp. 261-282.
Chi, Super-resolution microscopy: breaking the limits. Nature Methods, vol. 6, No. 1, Jan. 2009, pp. 15-18.
Zhou et al "Three Dimensional Holographic Reconstruction of Two-Dimensional Image Information from Serial Sections and its Applications in Biomedicine", Optics and Laser Technology,. Elsevier Science Publishers Bv., vol. 17, No. 1, Feb 1, 1985, pp. 23-26, XP024499958.
Monemahghdoust et al., "Full Field Vertical Scanning in Short Coherence Digital Holographic Microscope", Optics Express, vol. 21, No. 10, May 15, 2013, p. 12643.
Rosen et al., "Theoretical and Experimental Demonstration of Resolution Beyond the Rayleigh Limit by FINCH Fluorescence Microscopic Imaging", Optics Express, Dec. 19, 2011, vol. 19, No. 27, 26249-7001.
Partial Supplementary EPO Search Report in corresponding Application No. 15/21651.6 of Feb. 6, 2018.

* cited by examiner

SYSTEM AND METHOD FOR HOLOGRAPHIC IMAGING OF A SINGLE PLANE OF AN OBJECT

CROSS-REFERENCE TO RELATED APPLICATIONS

This application is a continuation of U.S. application Ser. No. 15/326,336 filed Jan. 13, 2017, which is the U.S. national phase of International Application No. PCT/US2015/040024, filed Jul. 10, 2015, which designated the U.S. and claims the benefit of U.S. Provisional Application Ser. No. 62/023,958 filed Jul. 14, 2014, the entire contents of each of which are incorporated herein by reference.

FIELD OF THE INVENTION

The present invention is directed toward a method in self-referenced holography to eliminate the unique ambiguities inherent in self-referenced holographic images which result from the process so as to produce the highest-resolution components of said image.

BACKGROUND OF THE INVENTION

Self-Referenced Holography (SRH) is a class of coherent and incoherent holographic methods—including but not limited to Fresnel Incoherent Correlation Holography (FINCH, subject of U.S. Pat. Nos. 8,009,340 B2, 8,179,578 B2, 8,405,890 B2 and 8,542,421 B2)—in which the light emanating from an object is used to create an interference pattern dependent on the object's shape and distance with respect to the optical system and image recorder. This is in contrast to classical non-self-referenced coherent holography which requires a coherent source. The advantages of SRH over non-SRH coherent holography stem from this fact. SRH methods do not require expensive coherent sources and multiple beam paths and are capable of working under any illumination conditions.

In general, holographic methods are used to create three-dimensional (3D) images of objects without requiring motion of the object or the imaging system. While this can sometimes be advantageous over classical imaging methods, the resolution and other image quality metrics of the 3D images can be compromised by the characteristics of holographic methods. The authors have discovered a way to maximize the quality of single plane images by using a modification of holographic methods.

In certain configurations, notably an optimized configuration of FINCH, some SRH methods also are able to provide final processed images that are better resolved by a factor of as much as two than images produced by classical methods (optical super-resolution), where the classical methods are holographic or not. Discussing FINCH, and referring to prior art FIG. 1, it is shown that one optimal configuration of FINCH to achieve optical super-resolution utilizes an objective lens 101 to receive the light from a sample 100 located at the objective lens front focal plane 118 and direct this light to the rest of the optical system. The objective lens front focal plane is located at the distance of the objective lens focal length $f_0$ away from the lens. The optical system comprises relay lenses 103, 105 with an internal image plane 104 between them, as well as certain polarization-sensitive optical elements in an assembly (PSOA) 106 with two polarization-dependent lens functions used to create (from each point in the object) two co-propagating beams with differing spherical wavefront curvatures. Additionally, the relay optics 103, 105 are required to transmit the exact image of the back pupil plane 102 of the objective to the first optically-powered surface of the PSOA 106, i.e. to negate the distance between the objective lens and the polarization sensitive optic. The two beams emerging from the PSOA 106 are caused to interfere at a detection plane 108, creating the hologram that is recorded. It is noted that while several holograms of each object with varying phase factors are usually recorded, as well known in the literature (see Siegel et al. and references therein), the discussion of the present invention refers to all of these holograms as a single hologram for simplicity. After recording the hologram, to create the final image the hologram is processed digitally by propagating it by a reconstruction distance $z_r$ that depends on the system factors as well as the location of the object points that created the hologram. The optimal condition for super-resolution requires that the two beams have the same radial size at the detection plane, which can only be achieved for a single optimal object plane, generally at the front focal plane 118 of the objective lens 101. Further, when the optimal plane is located inside the object, the optical physics of FINCH dictate that the object light originating from either side of this optimal plane will result in final images occupying the same space in the image. That is, half of the three-dimensional image is reversed and superimposed on the other half. This is understood by reference to the equation describing the reconstruction distance relating locations in image space to locations in object space that are not at the first lens front focal plane 118, adapted and simplified from equation 7 in Siegel et al (Optics Express 2012):

$$|z_r| = \left| \frac{C_1 z_d^2 - C_2 z_d + C_3}{z_d^2 (f_{d1} - f_{d2})} \right|, \text{ with} \quad (1)$$

$$z_d = \frac{z_s f_0}{z_s - f_0} \quad (2)$$

$$C_1 = z_h^2 + f_{d1} f_{d2} - z_h (f_{d1} + f_{d2}),$$

$$C_2 = z_h^2 + (f_{d1} + f_{d2}) - 2 z_h f_{d1} f_{d2}$$

$$C_3 = z_h^2 f_{d1} f_{d2}$$

in which $z_s$ is the distance of the object away from the objective lens 101, $f_0$ is the focal length of the objective lens 101, $f_{d1}$ and $f_{d2}$ are the focal lengths of the lens functions in the PSOA 106, and $z_h$ is the distance from the PSOA 106 at which the hologram is recorded. As can be seen, $z_d$ is the only term dependent on the location of the object with respect to the optical system. Note that the expression here for $z_d$ differs from that in Siegel et al by omission of a term d, similar to $z_1$ here, for the distance between the first lens and the polarization sensitive optics, i.e. small or zero value of d or $z_1$ is assumed due to the presence of the relay lens system. Since $z_d$ is the largest term to start with (as the denominator term $z_s$-$f_0$ term is generally quite small with respect to the numerator $z_s f_0$ of the equation) it is the term that dictates the sign of the reconstruction distance in equation 1. And further, since the dominant way in which the $z_d$ term is present in equation 1 is as a quadratic power, the image-reversal problem is understood: as the location of the object plane moves away from the first lens focal plane 118 in either direction, the $z_d$ term itself takes a positive or negative value depending on whether $z_s$ or $f_0$ is larger. However, since the $z_d$ term is squared in the largest terms in both the numerator and denominator of equation 1, the sign of the reconstruction distance $z_r$ stays the same and object planes on both sides of the first lens focal plane 118 possess similar $z_r$ values and thus reconstruct in the same image plane space. Certain arrangements of the optics and object can be made to eliminate this effect, but all such arrangements reduce the resolution in the final processed image. Thus there is a clear need for a system and method to eliminate the image reversal problem and maintain only the highest resolution information in the final image.

SUMMARY OF THE INVENTION

Accordingly the inventors disclose a system and method to adapt FINCH and other SRH methods to eliminate the image reversal problem while keeping only the highest resolution information in the final image. The inventors have realized that a confocal method such as point scanning confocal, spinning disk confocal or multi-photon excitation can be used to isolate the light from only one specific object plane at a time and thus maintain the maximal super-resolution characteristics of FINCH while avoiding the image reversal problem. For example, a confocal pinhole or disk at a conjugate image plane between the object and the hologram detection plane, for example the internal plane of the relay system, can be used to achieve the maximum possible FINCH resolution of any single object plane conjugate to the plane containing the pinhole or disk, while at the same time preventing the partial image reversal that would result from imaging an extended object with FINCH in such an arrangement. By restricting the light reaching the detector plane to origination from a single object plane, the Nipkow disk here eliminates the partial image reversal problem and enables FINCH to operate effectively as a 2× super-resolution optical microscope comparable to Structured Illumination Microscopy (SIM, see Jost et al.) and related methods. A similar effect could be achieved by scanning a multi-photon excitation spot throughout the object in all three dimensions while adjusting the camera to record the best possible hologram for every plane in the object.

Thus, in one preferred embodiment of the invention as shown in FIG. 2, a spinning Nipkow disk 200 is placed at the internal conjugate focal plane 104 of the relay subsystem, conjugate to the objective focal plane 118, as in a confocal microscope. This disk confers the specific holographic advantages described above for the objects located at the objective focal plane. An extended object may be translated through the objective focal plane, allowing a composite 3D image to be assembled from sequential holograms, all parts of which are optically super-resolved at the maximum capability of the system and all of which bear no image reversal artifacts.

In another preferred embodiment of the invention as shown in FIG. 3, the object is kept stationary in a position removed from the focal plane 118 of the objective 101 while the spinning disk 200 is moved to the conjugate plane 300 of the object that is not at the objective focal plane. At the same time the hologram detection plane 302 is moved to the location at which the two beams produced by points in the selected plane are equal in size, in order to capture the maximum possible resolution. It should be noted that the disk and camera may be moved directly themselves or effectively moved by means of translating corner cube mirror groups or similar methods. It is further noted that while FIG. 3 depicts an object below the plane of focus of the objective, an equivalent schematic may be drawn for objects that are above the objective plane of focus. In this way again, a 3D composite image of maximum possible super resolution and zero image reversal can be obtained.

In a further embodiment of the invention, an excitation pattern confocally confined to a single plane by optical means such as spatial filtering of a laser beam or use of multiphoton excitation principles is scanned through the various planes of the object, which scanning is performed by adjustment of the optical train coupling the excitation into the objective lens to bring the excitation beam to focus at varying planes of the object. The emitted light from the object is then passed through to the holographic system without traversing a disk or pinhole, and the optical path length to the camera is adjusted by translating the camera 115 or by means of a corner cube assembly or similar method in order to ensure maximum quality of the recorded hologram for each plane of the object. A 3D super-resolved image is thus acquired by accumulating the final processed images from the individual holograms of many object planes.

It is further noted that other optical systems have the potential to achieve similar effects, and in fact any system containing conjugate optical planes may be adapted with a confocal device at one of those planes, which device will direct light from undesired planes away from the detection plane in order to maximize the resolution in the final image and avoid the image reversal problem. Since FINCH is the most advanced SRH technique for high resolution microscopy, this document chiefly addresses the invention with reference to FINCH techniques and visible light. However it is understood that the invention is applicable to other incoherent and coherent SRH techniques and capable of alternate embodiments involving other techniques and other types of electromagnetic radiation. The scope of the invention is thus not limited to FINCH alone or visible light alone but extends to other techniques and types of electromagnetic radiation, and the invention may be practiced otherwise than as described herein.

DETAILED DESCRIPTION OF THE DRAWINGS

With reference to the detailed discussion of the drawings, it is emphasized that the drawings and descriptions are meant to present the composition and operating principles to a sufficient degree to enable a fundamental understanding of the method and system of the invention. Thus certain details such as polarization sensitive optics and compound lens assemblies are represented in the most simplified form to present a clear and readily understood schematic, appropriate to enable one skilled in the art to appreciate the system and method.

Figure 1:
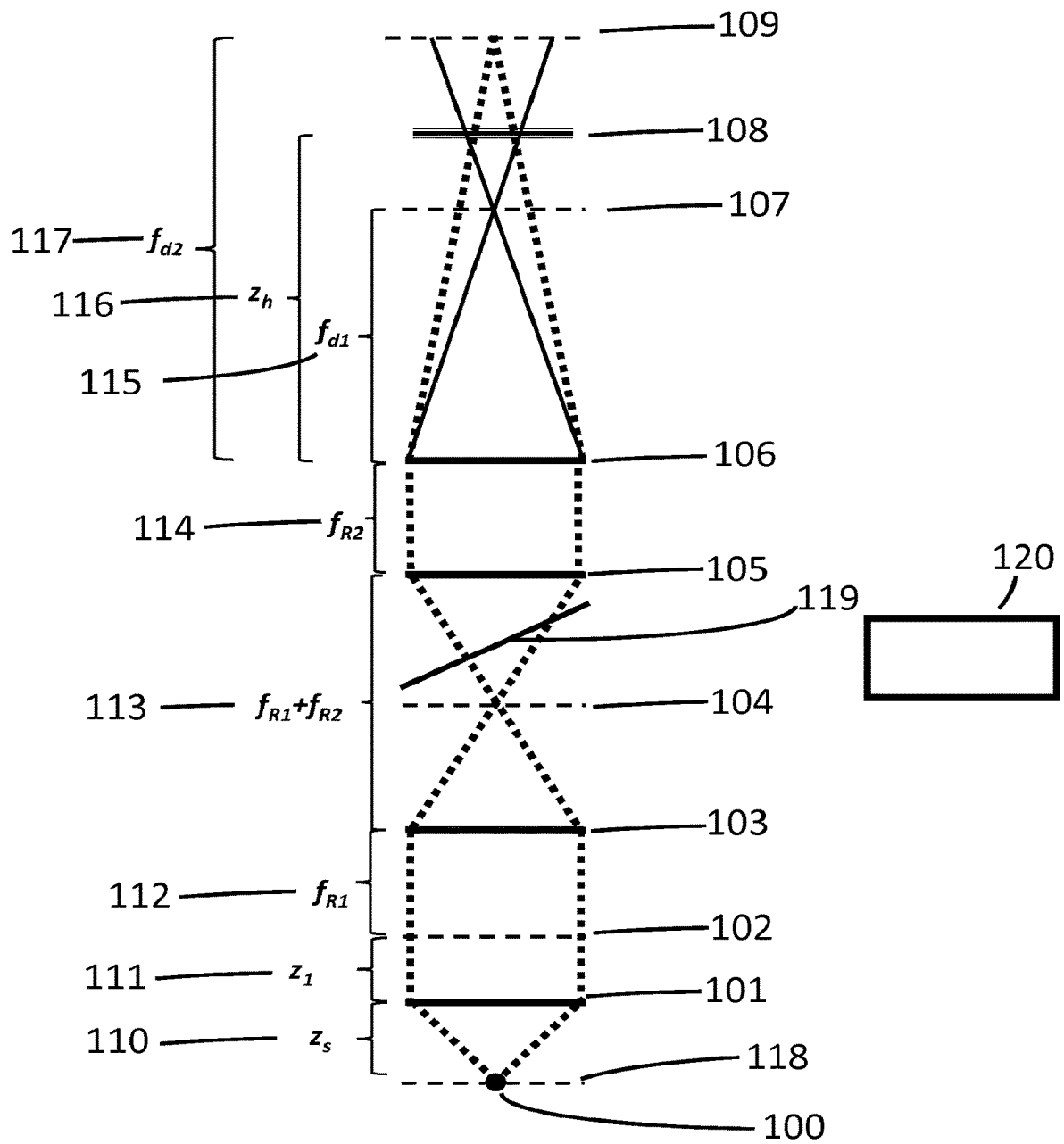
FIG. 1 (Prior Art) is a schematic of a general FINCH system incorporating a relay subsystem containing a conjugate image plane.

FIG. 1 is a schematic depicting prior art, in this case a FINCH microscope system, and is included to serve as background information to illustrate the concepts discussed further in the description of the invention. A single infinitesimal point 100 located at the front focal plane 118 of the objective lens 101 is considered as an ideal object, with real objects considered as the sum of many single points. After excitation light is introduced into the object 100 from the excitation source 120 by means of the dichroic mirror 119, light emanates from the object 100 and travels a distance $z_s$ 110 to the objective lens 101, which possess focal length $f_0$. From the objective, the light travels a distance 111 $z_1$ through the objective back pupil 102 and then a further distance 112 equal to the focal length $f_{R1}$ of the first relay lens 103, before reaching the first relay lens 103. The light travels a further distance 113, equal to the sum of the first relay lens focal length and the second relay lens 105 focal length $f_{R2}$, before reaching the second relay lens 105. From there the light travels a further distance 114 equal to $f_{R2}$ to the polarization sensitive optical assembly (PSOA) 106. It is noted that the two relay lenses comprise a 4f optical relay, which duplicates at its output plane (just before 106) the light distribution that impinged on its input plane at 102, scaled by the magnification ratio $f_{R2}/f_{R1}$. This effectively negates the distance between the objective lens back pupil and the PSOA 106 which actually creates the hologram, and is critical to ensure concentricity of the co-propagating beams produced by 106. The relay pair also contains a conjugate real image plane 104 at a distance of $f_{R1}$ after the first relay lens and $f_{R2}$ before the second relay lens. The PSOA 106, which possesses two polarization dependent lens functions, focuses part of the light to a focal plane 107 located a distance 115 of far from the PSOA 106, and part of the light to a focal plane 109 located a distance 117 of fun away from 106. This is equivalent to a single lens located at the position of 106 having two focal lengths $f_{d1}$ and $f_{d2}$. This differential focusing procedure effectively splits the light beam coming from each object point into two co-propagating, concentric beams with different spherical wavefront curvatures. The two beams are equivalent in spatial size at a single plane known as the hologram plane 108 located a distance 116 $z_h$ away from 106 and the interference between the two beams is captured there as a hologram. The collected hologram is then processed computationally by well-known methods to result in the final image. It is readily understood that all conjugate image planes are at the back focal planes of 103 and 106 only in cases in which the object 100 is at the front focal plane of the objective 101, i.e. $z_s = f_0$; if $z_s \neq f_0$, the conjugate image planes change their location in space according to well-known laws of optics. It follows then that the plane $z_h$ 108 only contains perfectly size-matched beams from the objects originating in the front focal plane of 101. Objects not in that front focal plane create perfectly size matched pairs of beams at different planes after the PSOA 106. Thus perfectly overlapped holograms and subsequently maximum resolution final images can only be obtained from a single object plane at one time.

Figure 2:
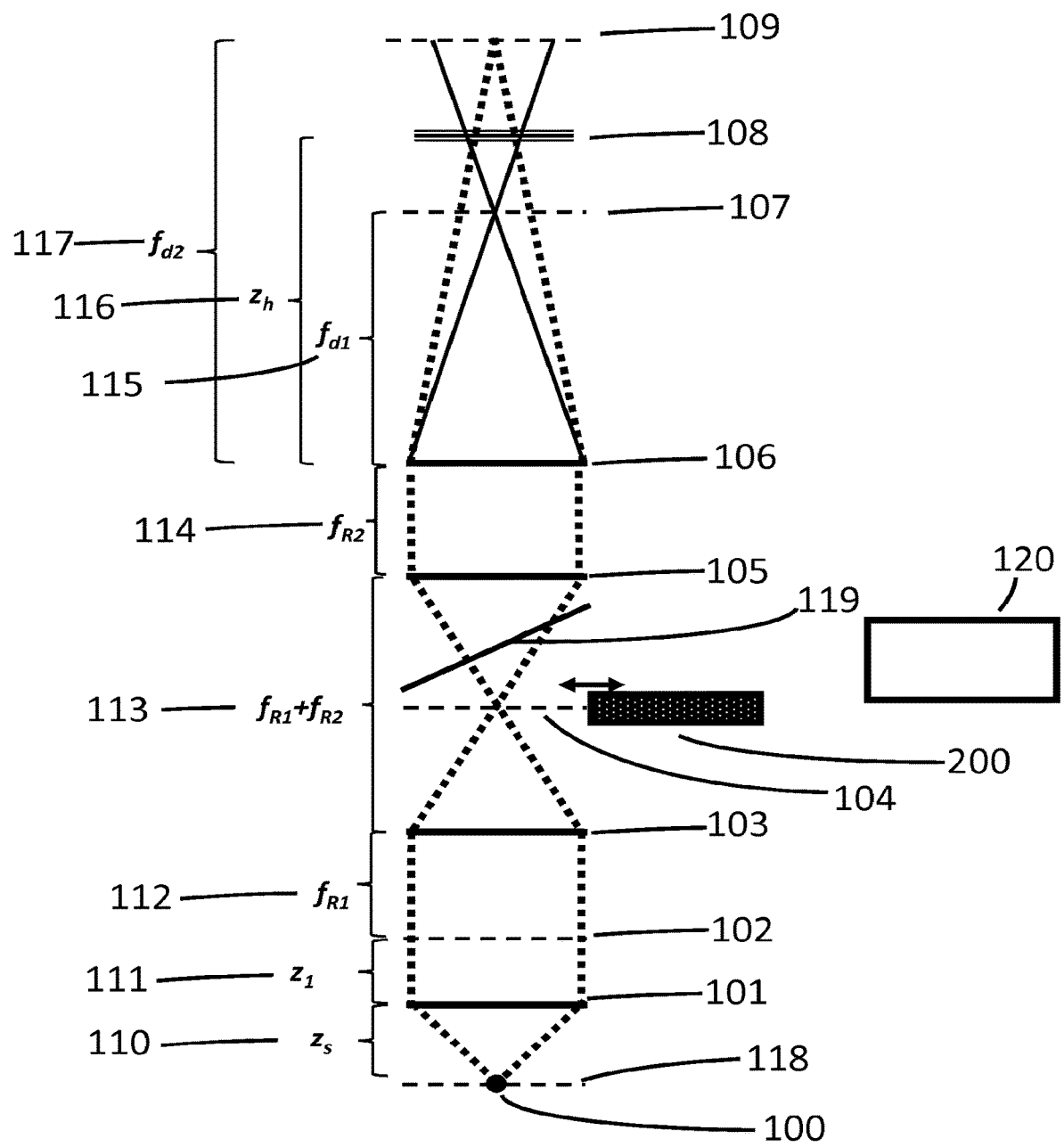
FIG. 2 is a schematic of a FINCH system with a removable spinning Nipkow disk at the conjugate image plane inside a relay subsystem, according to a preferred embodiment of the present invention.

FIG. 2 depicts one preferred embodiment of the invention, in which a spinning Nipkow disk 200 is inserted between the relay lenses of a system otherwise identical to that described in FIG. 1. As in the system described in U.S. Pat. No. 6,147,798 B2, the Nipkow disk is placed on a rail and can be inserted into or removed from the optical path. It is placed at the internal conjugate image plane 104 of the relay, as in the standard arrangement of a confocal microscope. It can readily be seen that the disk isolates the light emanating from the object portion in the objective focal plane and creates perfectly size matched and overlapped holograms at the plane $z_h$ that will attain maximum possible resolution and avoid the image reversal problem as described in the background of the invention.

Figure 3:
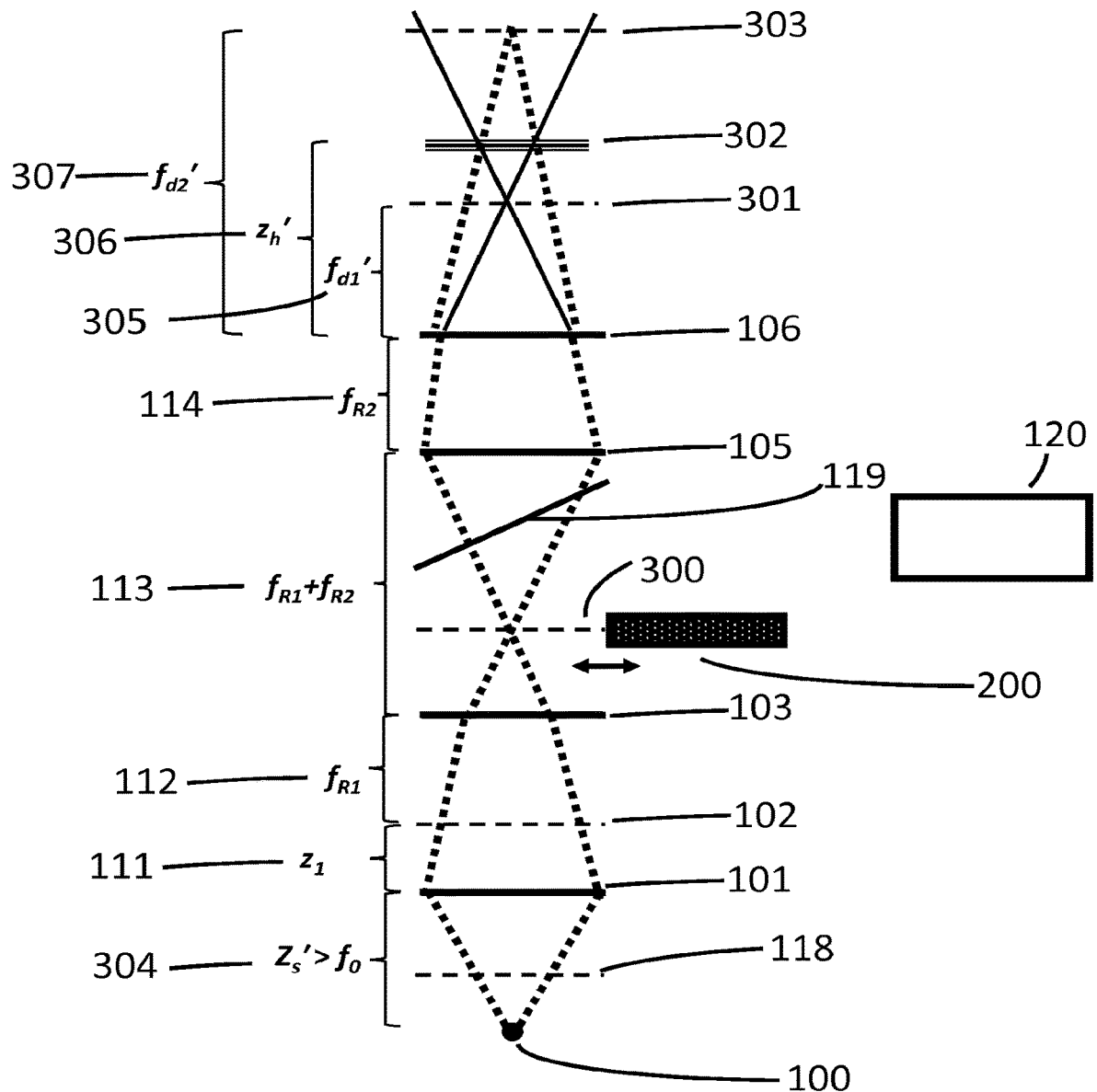
FIG. 3 is a schematic of a FINCH system viewing single plane of an object away from the focal plane of the first lens in the FINCH system, showing the modified locations of the conjugate image planes, according to a preferred embodiment of the present invention.

FIG. 3 depicts another preferred embodiment of the invention, in which the disk is translated along the optical axis to a conjugate image plane corresponding to an object plane not at the objective focal plane, and in which the recording plane for the hologram is also translated along the optical axis of the system to a plane at which the two differential beams from the PSOA 106 are size matched and can thus produce maximal resolution final images after processing. All other optics remain in the same location. In this case the object point considered is further away from the objective than the objective focal plane, and the emitted light must travel a distance 304 $z_s'$ before encountering the objective. However the conjugate plane 300 inside the relay system is moved closer to the first relay lens 103, and the effective focal planes 301 and 303 of the PSOA 106 are moved to locations that are different distances 305 $f_{d1}'$ and 307 $f_{d2}'$ away from 106. The optimal recording plane 302 is also moved to a distance $z_h'$ 306 away from 106. In this way a maximum resolution final image may be produced from a point away from the front focal plane of the objective, again without the image reversal problem. It is noted that analogous changes in the locations of the conjugate image planes happen in the opposite direction if the object is closer to the objective than the objective focal plane, with the difference that the conjugate image planes move further away from the first relay lens instead of closer to it. Additionally, in either case the camera need not be moved, but the optical path length may be changed by means of translating corner cube mirrors and similar optics to match the beam sizes at the detection plane.

REFERENCES CITED

U.S. Patent Documents

U.S. Pat. No. 8,009,340 B2 August 2011 Rosen
U.S. Pat. No. 8,179,578 B2 May 2012 Rosen et al.
U.S. Pat. No. 8,542,421 B2 September 2013 Rosen et al.
U.S. Pat. No. 8,405,890 B2 March 2013 Rosen
U.S. Pat. No. 6,147,798 B2 November 2000 Brooker et al.

OTHER PUBLICATIONS

Siegel et al., in Optics Express, Vol. 20, p. 19822 (2012).
Jost, et al., in Annu. Rev. Mater. Res. Vol/43, pp 261-282 (2013).

What is claimed is:

1. A holographic method for detecting self-interference of incoherent light waves emitted exclusively from a single plane of a three dimensional object, without detecting any light originating from any other planes of said object, the method comprising:

optically exciting said single plane exclusive to said any other planes;
receiving, at an optical arrangement, incoherent light waves from said single plane of said object;
forming, from the incoherent light waves received at the optical arrangement, a first beam of incoherent light waves with a first spherical wavefront curvature and a second beam of incoherent light waves from incoherent light waves with a second spherical wavefront curvature differing from the first spherical wavefront curvature; and recording, as a hologram, a pattern of interference between the first and second beams of incoherent light waves.

2. The method of claim 1 in which the incoherent light waves are fluorescent light, luminescent light, or reflected light.

3. The method of claim 1, wherein the receiving includes initially collecting the incoherent light waves from the single plane of the object with a microscope objective.

4. The method of claim 1, wherein the optical excitation of a single plane of the object exclusive to any other planes of the object is practiced by exciting with a spatially filtered laser beam.

5. The method of claim 1, wherein the optical excitation of a single plane of the object exclusive to any other planes of the object is practiced by exciting with two-photon excitation.

6. The method of claim 1, wherein the excitation is adjusted to sequentially exclusively excite different planes of the object;
wherein recording of the hologram is practiced using a camera; and
wherein the optical path length from the object to the camera is sequentially adjusted corresponding to the excitation adjustment in order to ensure that the camera records the holograms of the sequentially excited planes at maximum quality.

7. The method of claim 1, wherein the recorded hologram is digitally reconstructed into an image of the single plane of the three-dimensional object.

8. The method of claim 7, wherein the resolution of the image exceeds the Rayleigh or Abbe limit.

9. A holographic system for detecting self-interference of incoherent light waves emitted exclusively from a single plane of a three dimensional object, without detecting any light originating from any other planes of said object, the system comprising:
an optical excitation arrangement configured to:
optically excite said single plane exclusive to said any other planes:
an optical receiving arrangement configured to:
receive incoherent light waves from said single plane of said object; and
form, from the incoherent light waves received at the optical arrangement, a first beam of incoherent light waves with a first spherical wavefront curvature and a second beam of incoherent light waves with a second spherical wavefront curvature differing from the first spherical wavefront curvature; and
a detector configured to:
record, as a hologram, a pattern of interference between the first and second beams of incoherent light waves.

10. The system of claim 9 in which the incoherent light waves are fluorescent light, luminescent light and reflected light.

11. The system of claim 9, wherein the receiving includes initially collecting the incoherent light waves from the single plane of the object with a microscope objective.

12. The system of claim 9, wherein the optical excitation arrangement operates by exciting with a spatially filtered laser beam.

13. The system of claim 9, wherein the optical excitation arrangement operates by exciting with two-photon excitation.

14. The system of claim 9, wherein the detector is a camera and wherein the camera can be translated to locate the camera at the optimal hologram recording position for the single plane of the object.

15. The system of claim 12, wherein the excitation is capable of being adjusted to sequentially exclusively excite different planes of the object:
wherein the detector is a camera; and
wherein the optical path length from the object to the camera is capable of being sequentially adjusted corresponding to the excitation adjustment in order to ensure that the camera records the holograms of the sequentially excited planes at maximum quality.

16. The system of claim 9, wherein the recorded hologram is digitally reconstructed into an image of the single plane of the three-dimensional object.

17. The system of claim 16, wherein the resolution of the image exceeds the Rayleigh or Abbe limit.

18. A holographic method for detecting self-interference of electromagnetic waves emitted exclusively from a single plane of a three dimensional object, without detecting any light originating from any other planes of said object, the method comprising:
optically exciting said single plane exclusive to said any other planes;
receiving, at an optical arrangement, electromagnetic waves from said single plane of said object;
forming, from the electromagnetic waves received at the optical arrangement, a first beam of electromagnetic waves with a first spherical wavefront curvature and a second beam of electromagnetic waves from electromagnetic waves with a second spherical wavefront curvature differing from the first spherical wavefront curvature; and
recording, as a hologram, a pattern of interference between the first and second beams of electromagnetic waves,
wherein the recorded hologram is digitally reconstructed into an image of the single plane of the three-dimensional object, and the resolution of the image exceeds the Rayleigh or Abbe limit.

19. The method according to claim 18, wherein the electromagnetic waves are incoherent light.

20. A holographic system for detecting self-interference of electromagnetic waves emitted exclusively from a single plane of a three dimensional object, without detecting any light originating from any other planes of said object, the system comprising:
an optical excitation arrangement configured to:
optically excite said single plane exclusive to said any other planes:
an optical receiving arrangement configured to:
receive electromagnetic waves from said single plane of said object; and
form, from the electromagnetic waves received at the optical arrangement, a first beam of electromagnetic waves with a first spherical wavefront curvature and a second beam of electromagnetic waves with a second spherical wavefront curvature differing from the first spherical wavefront curvature:
a detector configured to:
record, as a hologram, a pattern of interference between the first and second beams of electromagnetic waves,
wherein the recorded hologram is digitally reconstructed into an image of the single plane of the three-dimensional object, and the resolution of the image exceeds the Rayleigh or Abbe limit.

21. The system according to claim 20, wherein the electromagnetic waves are incoherent light.

22. A holographic method for detecting self-interference of electromagnetic waves emitted exclusively from a single plane of a three dimensional object, without detecting any light originating from any other planes of said object, the method comprising:

- optically exciting said single plane exclusive to said any other planes;
- receiving, at an optical arrangement, electromagnetic waves from said single plane of said object;
- forming, from the electromagnetic waves received at the optical arrangement, a first beam of electromagnetic waves with a first spherical wavefront curvature and a second beam of electromagnetic waves from electromagnetic waves with a second spherical wavefront curvature differing from the first spherical wavefront curvature; and
- recording, as a hologram, a pattern of interference between the first and second beams of electromagnetic waves,
- wherein the optical excitation of a single plane of the object exclusive to any other planes of the object is practiced by exciting with two-photon excitation.

23. The method according to claim 22, wherein the electromagnetic waves are incoherent light.

24. A holographic system for detecting self-interference of electromagnetic waves emitted exclusively from a single plane of a three dimensional object, without detecting any light originating from any other planes of said object, the system comprising:

- an optical excitation arrangement configured to:
  - optically excite said single plane exclusive to said any other planes;
- an optical receiving arrangement configured to:
  - receive electromagnetic waves from said single plane of said object; and
  - form, from the electromagnetic waves received at the optical arrangement, a first beam of electromagnetic waves with a first spherical wavefront curvature and a second beam of electromagnetic waves with a second spherical wavefront curvature differing from the first spherical wavefront curvature;
- a detector configured to:
  - record, as a hologram, a pattern of interference between the first and second beams of electromagnetic waves,
- wherein the optical excitation arrangement operates by exciting with two-photon excitation.

25. The system according to claim 24, wherein the electromagnetic waves are incoherent light.

* * * * *